US009402067B2

(12) United States Patent  
Park et al.

(10) Patent No.: US 9,402,067 B2  
(45) Date of Patent: Jul. 26, 2016

(54) IMAGING OPTICAL SYSTEM FOR 3D IMAGE ACQUISITION APPARATUS, AND 3D IMAGE ACQUISITION APPARATUS INCLUDING THE IMAGING OPTICAL SYSTEM

(71) Applicant: SAMSUNG ELECTRONICS CO., LTD., Suwon-si (KR)

(72) Inventors: Yong-hwa Park, Yongin-si (KR); Alexander Gorelov, Moscow (RU); Jang-woo You, Yongin-si (KR); Alexander Shirankov, Moscow (RU); Seung-wan Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 260 days.

(21) Appl. No.: 14/059,825

(22) Filed: Oct. 22, 2013

(65) Prior Publication Data

US 2014/0111620 A1    Apr. 24, 2014

(30) Foreign Application Priority Data

Oct. 22, 2012  (RU) ................................ 2012144759  
Jan. 3, 2013   (KR) ........................ 10-2013-0000639

(51) Int. Cl.
*H04N 13/02* (2006.01)  
*G02B 27/10* (2006.01)  
*G02B 3/08* (2006.01)

(52) U.S. Cl.
CPC .............. *H04N 13/0239* (2013.01); *G02B 3/08* (2013.01); *G02B 27/1006* (2013.01); *H04N 13/0271* (2013.01)

(58) Field of Classification Search
CPC ............. H04N 5/2254; H04N 13/0239; G02B 27/1006  
See application file for complete search history.

(56) References Cited

U.S. PATENT DOCUMENTS 5,249,046 A * 9/1993 Ulich .................... G01S 7/4802  
348/145  
6,100,517 A   8/2000 Yahav et al.  
(Continued)

FOREIGN PATENT DOCUMENTS

KR   10-2008-0113524 A   12/2008  
KR   10-2009-0026523 A   3/2009  
(Continued)

OTHER PUBLICATIONS

Seong-Jin Kim et al., "A Three-Dimensional Time-of-Flight CMOS Image Sensor With Pinned-Photodiode Pixel Structure"IEEE Electron Device Letters, vol. 31, No. 11, Nov. 2010.

(Continued)

*Primary Examiner* — Tuan Ho  
(74) *Attorney, Agent, or Firm* — Sughrue Mion, PLLC (57) ABSTRACT

An imaging optical system and a three-dimensional (3D) image acquisition apparatus which includes the imaging optical system are provided. The imaging optical system includes an object lens configured to transmit light; first and second image sensors having different sizes from each other; a beamsplitter on which the light transmitted by the object lens is incident, the beamsplitter being configured to split the light incident thereon into light of a first wavelength band and light of a second wavelength band, and to direct the light of the first wavelength band to the first image sensor and the light of the second wavelength band to the second image sensor; and at least one optical element, disposed between the beamsplitter and the second image sensor, configured to reduce an image that is incident on the second image sensor, the optical element including at least one of a Fresnel lens and a diffractive optical element.

20 Claims, 9 Drawing Sheets (56) References Cited

U.S. PATENT DOCUMENTS

| | | |
|---|---|---|
| 6,323,942 B1 | 11/2001 | Bamji |
| 6,483,094 B1 | 11/2002 | Yahav et al. |
| 7,016,519 B1 | 3/2006 | Nakamura et al. |
| 7,060,957 B2 | 6/2006 | Lange et al. |
| 7,095,487 B2 | 8/2006 | Gonzalez-Banos et al. |
| 7,224,384 B1 | 5/2007 | Iddan et al. |
| 7,274,393 B2 | 9/2007 | Acharya |
| 8,139,141 B2 | 3/2012 | Bamji et al. |
| 8,593,507 B2 | 11/2013 | Yahav |
| 2003/0123031 A1* | 7/2003 | Nelson ............... H04N 9/3105 353/31 |
| 2010/0128109 A1* | 5/2010 | Banks ................. G01S 7/4816 348/46 |
| 2011/0134222 A1 | 6/2011 | Yahav |

FOREIGN PATENT DOCUMENTS

| | | |
|---|---|---|
| KR | 10-2010-0138448 A | 12/2010 |
| KR | 10-2011-0024062 A | 3/2011 |
| KR | 10-2012-0045462 A | 5/2012 |
| KR | 10-2012-0135751 A | 12/2012 |

OTHER PUBLICATIONS

Taihto Aida et al.., "High-speed depth-mapping Axi-Vision Camera with compact optical system", SPIE-IS&T/ vol. 6805, Jan. 27, 2008.

M. Kawakita et al., "High-definition real-time depth-mapping TV camera; HDTV Axi-Vision Camera," Optics Express, vol. 12, No. 12, pp. 2781-2794, Jun. 2004.

* cited by examiner

IMAGING OPTICAL SYSTEM FOR 3D IMAGE ACQUISITION APPARATUS, AND 3D IMAGE ACQUISITION APPARATUS INCLUDING THE IMAGING OPTICAL SYSTEM

CROSS-REFERENCE TO RELATED APPLICATIONS

This application claims priority from Russian Patent Application No. 2012144759, filed on Oct. 22, 2012, in the Russian Intellectual Property Office, and Korean Patent Application No. 10-2013-0000639, filed on Jan. 3, 2013, in the Korean Intellectual Property Office, the disclosures of which are incorporated herein by reference in their entirety.

BACKGROUND

1. Field

Methods and apparatuses consistent with exemplary embodiments relate to an imaging optical system for a three-dimensional (3D) image acquisition apparatus, and a 3D image acquisition apparatus including the imaging optical system, and more particularly, to an imaging optical system having a decreased size and a 3D image acquisition apparatus including the imaging optical system so that the size of the 3D image acquisition apparatus may be decreased.

2. Description of the Related Art

As the demand for 3D display apparatuses has increased, the use of and request for three-dimensional (3D) contents have also increased. Accordingly, 3D image acquisition apparatuses such as 3D cameras for producing 3D contents have been developed. A 3D camera should acquire general two-dimensional (2D) color image information along with depth information via one photographing operation.

The depth information regarding a distance between surfaces of a target object and the 3D camera may be obtained by a stereo vision method using two cameras or by a triangulation method using structured light and a camera. However, as the distance from the target object is increased, the accuracy of the depth information substantially deteriorates when the aforementioned methods are used. Also, the depth information varies with the states of the surfaces of the target object, and thus, it is difficult to acquire accurate depth information when these methods are used.

In order solve these problems, a Time-of-Flight (TOF) method has been developed. In the TOF method, illumination light is irradiated to a target object, and then an optical flight time until light reflected from the target object is received by a light receiving unit is measured. The illumination light has a particular wavelength (e.g., a near infrared ray of 850 nm) and is irradiated to the target object by an illuminating optical system including a light-emitting diode (LED) or a laser-diode (LD), and light that has the same wavelength and is reflected from the target object is received by the light receiving unit. Thereafter, a series of processes in which the received light is modulated by using a modulator having a known gain waveform are performed to extract depth information. Various TOF methods using a predetermined series of optical processes have been introduced.

In general, a 3D camera using a TOF method includes an illuminating optical system for emitting illumination light to acquire depth information, and an imaging optical system for acquiring an image of a target object. The imaging optical system generates a general color image by sensing visible light reflected from the target object and simultaneously generates a depth image only having depth information by sensing illumination light reflected from the target object. For this purpose, the imaging optical system may separately include an object lens and an image sensor for visible light, and an object lens and an image sensor for illumination light (i.e., a two-lens and two-sensor structure). However, in the two-lens and two-sensor structure, a color image and a depth image have different fields of view, and thus, a separate process is required to accurately match the two images. Accordingly, a size of the 3D camera and the manufacturing costs are increased.

Thus, a 3D camera having one common object lens and two image sensors (i.e., a one-lens and two-sensor structure) has been developed. However, even in the one-lens and two-sensor structure, there remains a need to prevent volume and weight increases of an imaging optical system and the 3D camera and also an increase of the manufacturing costs.

SUMMARY

One or more exemplary embodiments may provide an imaging optical system having a decreased size, whereby a size of a 3D image acquisition apparatus having one common object lens and two image sensors with different sizes may be decreased.

One or more exemplary embodiments may further provide a 3D image acquisition apparatus including the imaging optical system.

Additional aspects will be set forth in part in the description which follows and, in part, will be apparent from the description, or may be learned by practice of the presented exemplary embodiments.

According to an aspect of an exemplary embodiment, there is provided an imaging optical system including an object lens configured to transmit light; first and second image sensors having different sizes; a beamsplitter on which the light transmitted by the object lens is incident, the beamsplitter being configured to split the light incident thereon into light of a first wavelength band and light of a second wavelength band, and direct the light of the first wavelength band to the first image sensor and the light of the second wavelength band to the second image sensor; and at least one optical element disposed between the beamsplitter and the second image sensor, being configured to reduce an image that is incident on the second image sensor, wherein the at least one optical element includes at least one of a Fresnel lens and a diffractive optical element (DOE).

The at least one optical element may include at least two of the Fresnel lenses which are sequentially disposed along an optical path between the beamsplitter and the second image sensor.

The at least one optical element may include a first optical element and a second optical element which are sequentially disposed along an optical path between the beamsplitter and the second image sensor, where the first optical element is a Fresnel lens and the second optical element is a DOE.

The Fresnel lens may be a collimating element that converts light reflected from the beamsplitter into parallel light, and the DOE may reduce an image by converging the parallel light onto the second image sensor.

The imaging optical system may further include an optical shutter which is disposed between the at least one optical element and the second image sensor and is configured to modulate the light of the first wavelength band light and provide the modulated light to the second image sensor.

The size of the second image sensor may be less than the size of the first image sensor, and the light of the first wavelength band may include visible light and the light of the second wavelength band may include infrared light.

The beamsplitter may be configured to transmit the light of the first wavelength band and may reflect the light of the second wavelength band.

According to an aspect of another exemplary embodiment, there is provided an imaging optical system including an object lens configured to transmit light; first and second image sensors having different sizes; and a beamsplitter on which the light transmitted by the object lens is incident, the beamsplitter being configured to split the light incident thereon into light of a first wavelength band and light of a second wavelength band, and direct the light of the first wavelength band to the first image sensor and the light of the second wavelength band to the second image sensor, wherein the beamsplitter is inclined by more than about 45 degrees with respect to an optical axis of the object lens.

The beamsplitter may include a plurality of first slopes which are formed on a light-incident surface of the beamsplitter to be inclined by about 45 degrees with respect to the optical axis of the object lens; and a plurality of second slopes which are formed on a light-exit surface of the beamsplitter to have a complementary shape with respect to the plurality of minute first slopes, wherein the plurality of first slopes and the plurality of second slopes are parallel to each other.

The beamsplitter may further include a wavelength separation filter configured to transmit the light of the first wavelength band and reflects the light of the second wavelength band, and the wavelength separation filter may be coated on the plurality of first slopes.

The beamsplitter may include reflective first diffraction patterns that are formed on a light-incident surface of the beamsplitter, wherein the reflective first diffraction patterns are configured to transmit the light of the first wavelength band and reflect the light of the second wavelength band, and are positioned so that a reflection angle of the reflected light of the second wavelength band is about 45 degree with respect to the optical axis; and second diffraction patterns that are formed on a light-exit surface of the beamsplitter and have a complementary shape with respect to the reflective first diffraction patterns.

The imaging optical system may further include at least one optical element disposed between the beamsplitter and the second image sensor, the at least one optical element being configured to reduce an image which is incident on the second image sensor, wherein the at least one optical element includes at least one of a Fresnel lens and a diffractive optical element (DOE).

According to an aspect of another exemplary embodiment, there is provided an imaging optical system including an object lens configured to transmit light; first and second image sensors having different sizes; and a beamsplitter on which the light transmitted by the object lens is incident, the beamsplitter being configured to split the light incident thereon into light of a first wavelength band and light of a second wavelength band, and to direct the light of the first wavelength band to the first image sensor and the light of the second wavelength band to the second image sensor, wherein the beamsplitter has a concave reflective surface coated with a wavelength separation filter which is configured to to transmit the light of the first wavelength band and to reflect the light of the second wavelength band.

The imaging optical system may further include a convex minor configured to reflect the light of the second wavelength band reflected by the beamsplitter, and a flat minor configured to reflect the light of the second wavelength band reflected by the convex minor toward the second image sensor.

The imaging optical system may further include a flat mirror configured to reflect the light of the second wavelength band reflected by the beamsplitter, and a convex minor configured to reflect the light of the second wavelength band reflected by the flat minor toward the second image sensor.

According to an aspect of another exemplary embodiment, there is provided an imaging optical system including an object lens configured to transmit light; first and second image sensors having different sizes; and a beamsplitter on which the light transmitted by the object lens is incident, the beamsplitter being configured to split the light incident thereon into light of a first wavelength band and light of a second wavelength band, and to direct the light of the first wavelength band to the first image sensor and the light of the second wavelength band to the second image sensor, wherein the beamsplitter includes a first dichroic mirror and a second dichroic mirror which are disposed in an upper region and a lower region, respectively, with respect to an optical axis of the object lens, wherein the first dichroic minor and the second dichroic minor partially contact each other along the optical axis of the object lens, and are folded by a predetermined angle with respect to a reflective surface of the second dichroic mirror, wherein the first dichroic mirror is configured to transmit the light of the first wavelength band and reflect the light of the second wavelength band toward the upper region, and wherein the second dichroic minor is configured to transmit the light of the first wavelength band and reflect the light of the second wavelength band toward the lower region.

The imaging optical system may further include a first minor that is disposed to face the first dichroic minor and is configured to reflect the light of the first wavelength band reflected by the first dichroic mirror toward the second image sensor; and a second minor that is disposed to face the second dichroic minor and is configured to reflect the light of the first wavelength band reflected by the second dichroic minor toward the second image sensor.

Reflective diffraction patterns having an image reduction function may be formed on a reflective surface of the first minor and a reflective surface of the second mirror.

According to an aspect of another exemplary embodiment, there is provided an imaging optical system including an object lens configured to transmit light; first and second image sensors having different sizes; a beamsplitter on which the light transmitted by the object lens is incident, the beamsplitter being configured to split the light incident thereon into light of a first wavelength band and light of a second wavelength band, and to direct the light of the first wavelength band to the first image sensor and the light of the second wavelength band to the second image sensor; and a fiber optic taper disposed between the beamsplitter and the second image sensor, and having a light-incident surface greater than a light-exit surface.

The imaging optical system may further include at least one optical element disposed between the beamsplitter and the fiber optic taper, the at least one optical element being configured to reduce an image which is incident on the second image sensor, wherein the at least one optical element includes at least one of a Fresnel lens and a diffractive optical element (DOE).

The at least one optical element may include the Fresnel lenses which is configured to convert light from the beamsplitter into parallel light, and the fiber optic taper may be configured to reduce an image by converging the parallel light onto the second image sensor.

The optical element may include the Fresnel lens which is configured to convert light from the beamsplitter into parallel light, and the DOE which is configured to reduce an image by converging the parallel light, and the fiber optic taper may be configured to additionally reduce the image that is reduced by the DOE.

According to an aspect of another exemplary embodiment, there may be provided a three-dimensional (3D) image acquisition apparatus including the imaging optical system, a light source configured to generate light of the second wavelength band and irradiate the light of the second wavelength band onto a target object; an image signal processor (ISP) configured to generate a 3D image by using an image output from the first image sensor and an image output from the second image sensor; and a control unit configured to control operations of the light source and the ISP.

The light source may be configured to irradiate the second wavelength band light having a predetermined period and a predetermined waveform to the target object, according to a control operation performed by the control unit.

The light of the first wavelength band may include visible light and the light of the second wavelength band may include infrared light, the first image sensor may be configured to generate a color image having a red (R) component, a green (G) component, and a blue (B) component for each of a plurality of pixels in the first image sensor, and the second image sensor may be configured to generate a depth image regarding a distance between the 3D image acquisition apparatus and the target object.

The ISP may be configured to calculate a distance between the target object and the 3D image acquisition apparatus for each of the plurality of pixels in the first image sensor by using the depth image output from the second image sensor, and combine calculation results with the color image output from the first image sensor, to therebygenerate a 3D image.

BRIEF DESCRIPTION OF THE DRAWINGS

These and/or other exemplary aspects will become apparent and more readily appreciated from the following description of exemplary embodiments, taken in conjunction with the accompanying drawings in which.

DETAILED DESCRIPTION

Reference will now be made in detail to exemplary embodiments of an imaging optical system for a three-dimensional (3D) image acquisition apparatus, and a 3D image acquisition apparatus including the imaging optical system, which are illustrated in the accompanying drawings. In the drawings, like reference numerals in the drawings denote like elements, and the size of each component may be exaggerated for clarity.

Expressions such as "at least one of," when preceding a list of elements, modify the entire list of elements and do not modify the individual elements of the list.

Figure 1:
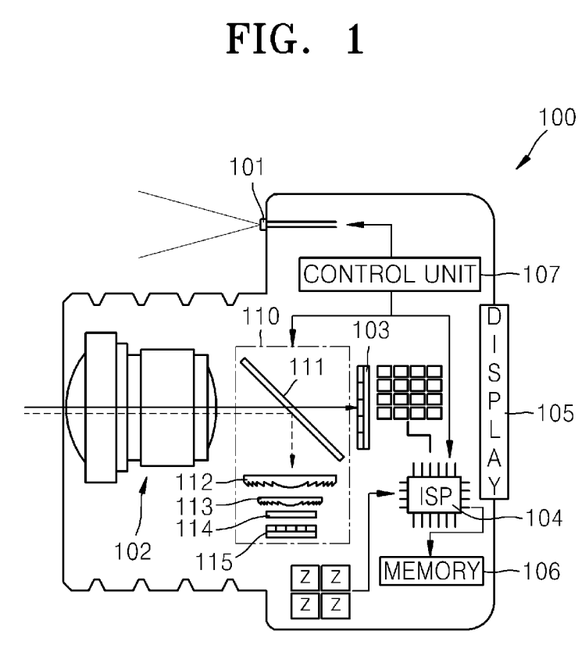
FIG. 1 is a conceptual drawing illustrating an imaging optical system and a structure of a 3D image acquisition apparatus including the imaging optical system according to an exemplary embodiment.

FIG. 1 is a conceptual drawing illustrating an imaging optical system and a structure of a 3D image acquisition apparatus 100 including the imaging optical system according to an exemplary embodiment. Referring to FIG. 1, the 3D image acquisition apparatus 100 may include a light source 101 for generating illumination light having a predetermined wavelength, an object lens 102 for focusing visible light and the illumination light that are reflected from an external target object (not shown), a first image sensor 103 for generating a color image by sensing the visible light focused by the object lens 102, a depth image module 110 for generating a depth image by sensing the illumination light focused by the object lens 102, an image signal processor (ISP) 104 for generating a 3D image by using the color image and the depth image, and a control unit 107 for controlling operations of the light source 101, the first image sensor 103, the depth image module 110, and the ISP 104. Also, the 3D image acquisition apparatus 100 may further include a memory 106 for storing a final 3D image and a display panel 105 for displaying the final 3D image.

For example, the light source 101 may be a light-emitting diode (LED) or a laser-diode (LD), which is capable of emitting illumination light that has a near infrared ray (NIR) wavelength of about 850 nm for safety purposes and is invisible to the human eyes. However, the aforementioned features of the light source 101 are exemplary and thus, illumination light in an appropriate different wavelength band and a different type of a light source may be used according to design requirements. Also, the light source 101 may emit illumination light in various forms, for example, a sine wave, a ramp wave, or a square wave, which has a specially-defined wavelength, in response to a control signal received from the control unit 107.

Also, the depth image module 110 may include a beamsplitter 111 that provides visible light to the first image sensor 103 by transmitting the visible light focused by the object lens 102 and that reflects illumination light, a second image sensor 115 that generates the depth image by sensing the illumination light reflected by the beamsplitter 111, at least one of the optical elements 112 and 113 that are disposed between the beamsplitter 111 and the second image sensor 115, and an optical shutter 114 that is disposed between the second image sensor 115 and the optical elements 112 and 113 and modulates the illumination light by using a predetermined gain waveform according to a Time-of-Flight (TOF) method. A wavelength separation filter that transmits light in a visible light band and reflects light in an NIR band may be coated on a surface of the beamsplitter 111. In the structure of FIG. 1, the beamsplitter 111 transmits visible light and reflects illumination light, but this configuration may be changed. According to design requirements, the beamsplitter 111 may transmit illumination light and may reflect visible light. Hereinafter, for convenience of description, it is assumed that the beamsplitter 111 transmits visible light and reflects illumination light.

In the exemplary embodiment of FIG. 1, the object lens 102, the first image sensor 103, the beamsplitter 111, the optical elements 112 and 113, the optical shutter 114, and the second image sensor 115 may configure the imaging optical system of the 3D image acquisition apparatus 100. For convenience, FIG. 1 illustrates a simple structure, but the object lens 102 may be a zoom lens including a plurality of lens groups. The first image sensor 103 and the second image sensor 115 may be semiconductor imaging devices such as charge-coupled devices (CCDs) or complementary metal-oxide-semiconductors (CMOSs). The first image sensor 103 and the second image sensor 115 each have a plurality of pixels, convert the amount of incident light into an electrical signal for each of the pixels, and then output the electrical signal. The first image sensor 103 for generating a general color image may have higher resolution, as compared to the second image sensor 115 for generating a depth image having depth information only. Thus, the second image sensor 115 may have a size smaller than a size of the first image sensor 103. Also, in order to acquire depth information with respect to a target object, the optical shutter 114 modulates the illumination light by using the predetermined gain waveform according to the TOF method. For example, the optical shutter 114 may be a GaAs-based semiconductor modulator enabled for a high-speed drive at several tens to several hundreds of MHz.

When the sizes of the first image sensor 103 and the second image sensor 115 are different, the color image generated by the first image sensor 103 and the depth image generated by the second image sensor 115 may have different fields of view. That is, the first image sensor 103 having the large size may generate the color image having a wide field of view whereas the second image sensor 115 may generate the depth image having a narrow field of view. Thus, in order to match fields of view of the first image sensor 103 and the second image sensor 115, a reducing optical system (of which magnification is less than 1) for reducing an image may be further disposed between the beamsplitter 111 and the second image sensor 115. By implementing a reducing optical system, an image reduced by the reducing optical system is incident on the second image sensor 115, so that a field of view of an image generated by the second image sensor 115 may be widened by the reduction. The optical elements 112 and 113 shown in FIG. 1 function as the reducing optical system.

When the reducing optical system is formed as a group of general refractive lenses (i.e., convex lenses or concave lenses), volumes and weights of the imaging optical system and the 3D image acquisition apparatus 100 may be increased, and thus, the manufacturing costs may be increased. Thus, in the present exemplary embodiment, each of the optical elements 112 and 113 that function as the reducing optical system may be formed as a thin-plate optical element such as a Fresnel lens or a diffractive optical element (DOE). FIG. 1 illustrates an example in which each of the optical elements 112 and 113 is formed of a Fresnel lens.

Figure 2:
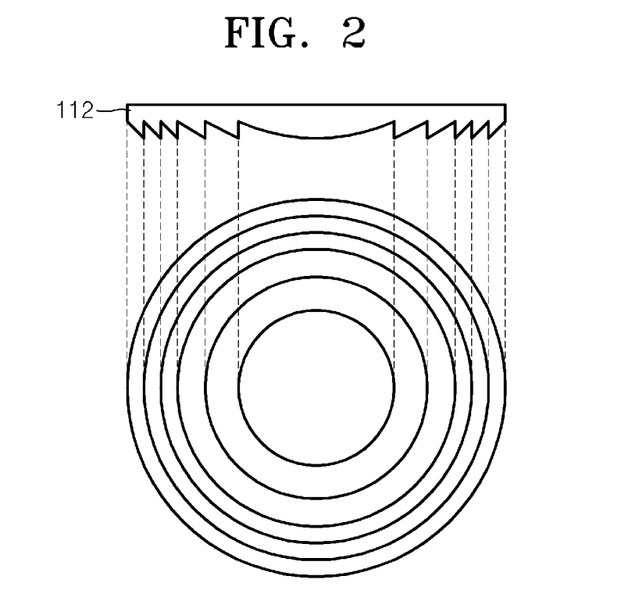
FIG. 2 is a cross-sectional view illustrating a structure of an optical element of FIG. 1.

As illustrated in FIG. 2, a Fresnel lens has a plurality of curved surfaces arranged in the form of concentric circles on a plane plate. Compared to a general convex lens or concave lens, the volume and weight of a Fresnel lens may be significantly smaller, and a focal length may be made very short. Thus, by using Fresnel lenses as the optical elements 112 and 113, a distance between the beamsplitter 111 and the second image sensor 115 may be substantially decreased. As a result, it is possible to decrease the volume and the weight of the 3D image acquisition apparatus 100 and to reduce the manufacturing costs.

FIG. 1 illustrates an example in which the optical elements 112 and 113 formed of Fresnel lenses are disposed between the beamsplitter 111 and the second image sensor 115. For example, both of the optical element 112 formed of a Fresnel lens and the optical element 113 formed of a Fresnel lens may function to reduce an image. Alternatively, the optical element 112 may function as a collimating element that converts light reflected from the beamsplitter 111 into parallel light, and the optical element 113 may reduce an image by converging the parallel light onto the second image sensor 115. Also, according to design requirements, only one Fresnel lens may be used, or three or more Fresnel lenses may be used to acquire an accurate image in which an aberration is compensated for.

Hereinafter, operations of the 3D image acquisition apparatus 100 will be briefly described. First, according to a control by the control unit 107, the light source 101 irradiates illumination light that is infrared light to a target object. For example, the light source 101 may irradiate light having a predetermined period and waveform to the target object, according to a TOF method. Afterward, the illumination light that is infrared light and reflected from the target object is focused by the object lens 102. At the same time, general visible light reflected from the target object is also focused by the object lens 102. Regarding light focused by the object lens 102, the visible light passes through the beamsplitter 111 and then is incident on the first image sensor 103. The first image sensor 103 is similar to an imaging device of a general camera and may generate a color image having a red (R) component, a green (G) component, and a blue (B) component for each pixel.

Regarding the light focused by the object lens 102, the illumination light that is infrared light is reflected by the beamsplitter 111 and then is incident on the optical elements 112 and 113. As described above, the optical elements 112 and 113 function to reduce an image by converging the illumination light onto the second image sensor 115. An image reduction ratio may be determined according to a ratio of sizes of the first image sensor 103 and the second image sensor 115. The illumination light that is converged by the optical elements 112 and 113 is modulated by the optical shutter 114 and then is incident on the second image sensor 115. The optical shutter 114 may modulate the illumination light by using a predetermined gain waveform having the same period as the period of the illumination light, according to the TOF method.

The second image sensor 115 generates a depth image by converting the amount of the modulated illumination light into an electrical signal for each pixel. Afterwards, the depth image output from the second image sensor 115 may be input to the image signal processor 104. The image signal processor 104 may calculate a distance between the target object and the 3D image acquisition apparatus 100 for each pixel by using the depth image output from the second image sensor 115, may combine calculation results with a color image output from the first image sensor 103, and thus may generate a 3D image. The 3D image may be stored in the memory 106 or may be displayed on the display panel 105.

Figure 3:
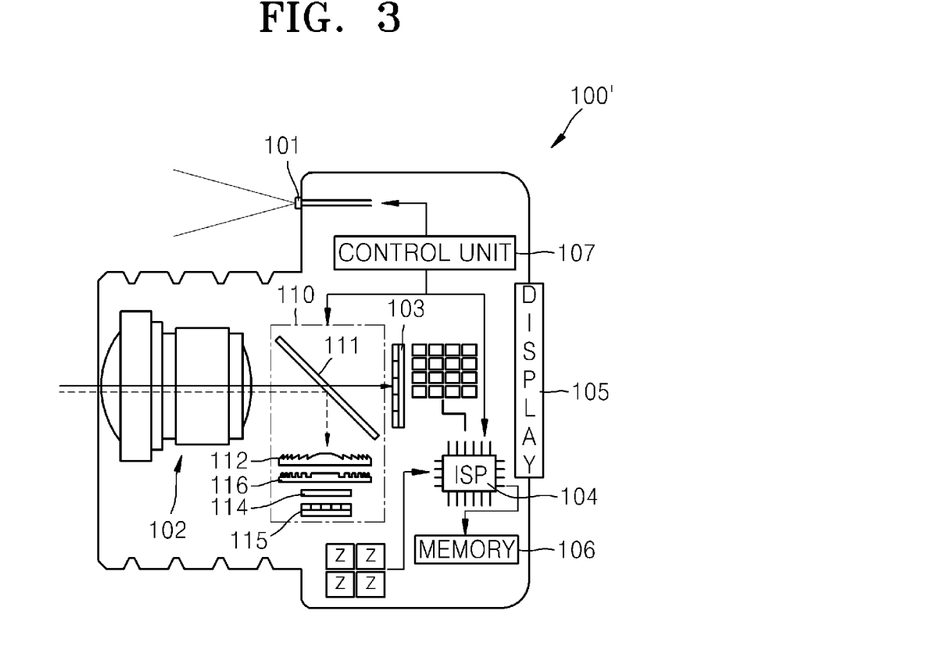
FIG. 3 is a conceptual diagram illustrating an imaging optical system including a diffractive optical element (DOE) and a structure of a 3D image acquisition apparatus including the imaging optical system according to another exemplary embodiment.

In the exemplary embodiment of FIG. 1, the optical elements 112 and 113 are formed of Fresnel lenses. However, one of the optical elements 112 and 113 that form the reducing optical system may be formed of a DOE, instead of a Fresnel lens. FIG. 3 is a conceptual diagram illustrating an imaging optical system including a DOE and a structure of a 3D image acquisition apparatus 100' including the imaging optical system according to another exemplary embodiment.

Referring to FIG. 3, the 3D image acquisition apparatus 100' may have a structure in which a reducing optical system including a first optical element 112 formed of a Fresnel lens and a third optical element 116 formed of the DOE is disposed between a beamsplitter 111 and a second image sensor 115. Similar to the Fresnel lens, the DOE has a plurality of concentric circle patterns that are disposed on a plane plate. However, each of the concentric circle patterns does not have a curved surface to refract light but has a grating pattern to diffract light. The DOE may strongly converge light according to a shape of the grating patterns that are concentrically arrayed. Also, similar to the Fresnel lens, the DOE may be very thin and light-weight.

In the exemplary embodiment of FIG. 3, the first optical element 112 formed of the Fresnel lens may function as a collimating element that converts light reflected from the beamsplitter 111 into parallel light, and the third optical element 116 formed of the DOE may reduce an image by converging the parallel light onto the second image sensor 115. For this, the first optical element 112 formed of the Fresnel lens may be disposed on a focal plane of an object lens 102. Since emitted light is not directly converged but is converged after being converted into parallel light, a difference between a central region and a peripheral region of an image may be decreased. FIG. 3 illustrates an example of the reducing optical system only including the first optical element 112 and the third optical element 116. However, according to design requirements, the reducing optical system may have a structure in which three or more Fresnel lenses and DOEs are combined. The rest of the configuration and functions of the 3D image acquisition apparatus 100' of FIG. 3 are the same as those of the 3D image acquisition apparatus 100 of FIG. 1, and thus, detailed descriptions thereof are omitted.

Figure 4A:
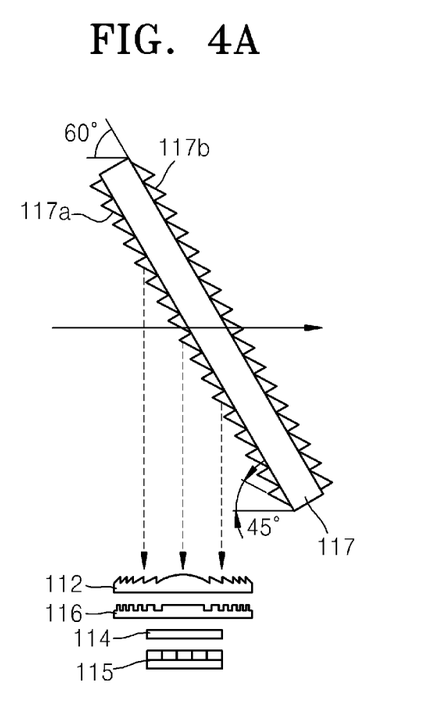
FIG. 4A is a conceptual diagram illustrating a structure of an imaging optical system, according to another exemplary embodiment.

FIG. 4A is a conceptual diagram illustrating a structure of an imaging optical system, according to another exemplary embodiment. In the embodiments of FIGS. 1 and 3, the beamsplitter 111 is formed by coating a wavelength separation filter on a flat surface. In general, the beamsplitter 111 is inclined by about 45 degrees with respect to an optical axis of the object lens 102, and thus, a transmitted image and a reflected image have the same amount. However, the exemplary embodiment of FIG. 4A may include a beamsplitter 117 that is inclined by an angle greater than about 45 degrees, e.g., about 60 degrees, with respect to the optical axis. By disposing the beamsplitter 117 to be inclined by more than about 45 degrees, a width of a reducing optical system may be further decreased. When the width of the reducing optical system is decreased, a distance between the object lens 102 and the first image sensor 103 may be decreased, so that widths of the 3D image acquisition apparatuses 100 and 100' may be decreased. Also, when the beamsplitter 117 inclined by more than about 45 degrees is used, an image incident on the second image sensor 115 may be reduced due to the beamsplitter 117. Thus, in the exemplary embodiment of FIG. 4A, the first optical element 112 and the third optical element 116 may be omitted.

In order to allow an image transmitted by the beamsplitter 117 that is inclined by more than about 45 degree to travel toward the first image sensor 103, and to allow an image reflected by the beamsplitter 117 to travel toward the second image sensor 115, as illustrated in FIG. 4A, a plurality of minute slopes 117a that are inclined at about 45 degrees with respect to the optical axis may be formed on a light-incident surface of the beamsplitter 117. For example, if the beamsplitter 117 is inclined by about 60 degrees with respect to the optical axis, the slopes 117a may be disposed to be inclined by about 15 degree with respect to the light-incident surface of the beamsplitter 117. Thus, the slopes 117a may maintain an angle of 45 degrees with respect to the optical axis. Similar to the beamsplitter 111 of FIGS. 1 and 3, a wavelength separation filter that transmits light in a visible light band and reflects light in an NIR band may be coated on surfaces of the slopes 117a.

In order to prevent light which has passed through the beamsplitter 117 from being distorted due to the slopes 117a, minute slopes 117b may be formed on a light-exit surface of the beamsplitter 117. For example, the slopes 117b formed on the light-exit surface of the beamsplitter 117 may have a complementary shape with respect to the slopes 117a formed on the light-incident surface of the beamsplitter 117. Thus, the slopes 117b formed on the light-exit surface of the beamsplitter 117, and the slopes 117a formed on the light-incident surface of the beamsplitter 117 may be parallel to each other.

In a structure of the beamsplitter 117, light reflected from one of the slopes 117a may be partially blocked by another one of the slopes 117a which is adjacent to the one slope. However, since the beamsplitter 117 is disposed on a non-imaging position, i.e., a non-focal plane of the object lens 102, an array of the slopes 117a may not have an effect on a final image focused onto the second image sensor 115. Also, when the slopes 117a are sufficiently small, an optical interference between the slopes 117a may be minimized so that it is possible to acquire a smooth reflected-image.

The rest of a configuration of the imaging optical system except for the beamsplitter 117 in FIG. 4A may be the same as the configuration of the imaging optical system of FIG. 1 or 3. For example, the optical elements 112 and 113 formed of Fresnel lenses, or the first optical element 112 and the third optical element 116 formed of a Fresnel lens and a DOE may be disposed between the beamsplitter 117 and the second image sensor 115. However, since an image may be reduced due to the beamsplitter 117 that is inclined by more than about 45 degrees, the exemplary embodiment of FIG. 4A may not include the first optical element 112 and the third optical element 116. Although FIG. 4A illustrates the first optical element 112 and the third optical element 116 that are formed of the Fresnel lens and the DOE, this is exemplary.

Figure 4B:
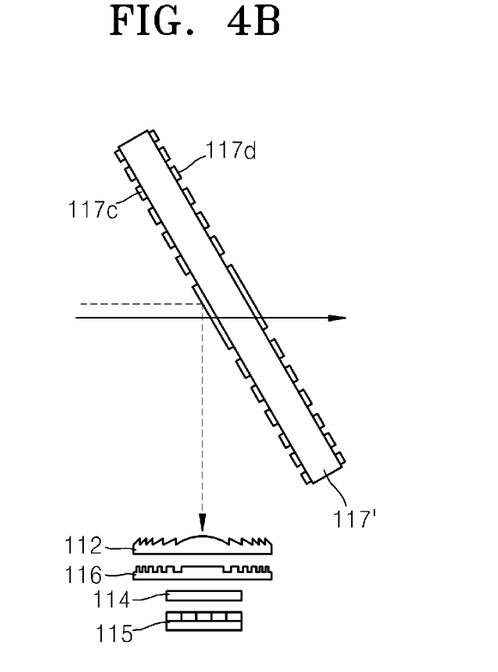
FIG. 4B is a conceptual diagram illustrating a modification of the exemplary embodiment of FIG. 4A.

Also, instead of the beamsplitter 117 on which the array of the slopes 117a having the wavelength separation filter coated thereon is disposed, as illustrated in FIG. 4B, a beamsplitter 117' on which reflective diffraction patterns 117c having a wavelength separation function and an image reduction function are formed may be used. The reflective diffraction patterns 117c may perform the same function as the function of the array of the slopes 117a having the wavelength separation filter coated thereon, and may reduce an image in addition to image reduction by the first optical element 112 and the third optical element 116. For example, reflection angles formed by the reflective diffraction patterns 117c may be uniformly maintained at a 45 degree angle with respect to the optical angle of the object lens 102. Also, in order to prevent distortion of an image that passes through the beamsplitter 117', diffraction patterns 117d having a complementary shape with respect to the reflective diffraction patterns 117c may be formed on a light-exit surface of the beamsplitter 117'. The diffraction patterns 117c and 117d may have various shapes according to an inclination degree of the beamsplitter 117', a wavelength band of light to be transmitted, a wavelength band of light to be reflected, a size of the beamsplitter 117', or the like.

Figure 5:
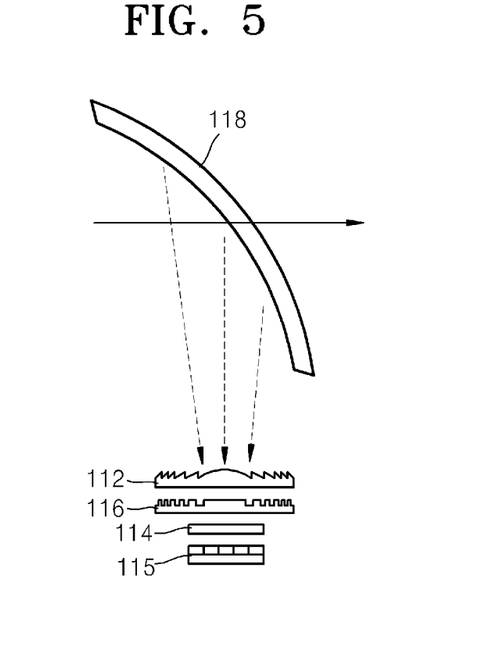
FIG. 5 is a conceptual diagram illustrating a structure of an imaging optical system, according to another exemplary embodiment.

FIG. 5 is a conceptual diagram illustrating a structure of an imaging optical system, according to another exemplary embodiment. The beamsplitters 111 and 117 illustrated in FIGS. 1, 3, and 4A are all of a plane plate type. However, the imaging optical system of FIG. 5 includes a beamsplitter 118 having a concave reflective surface coated with a wavelength separation filter. That is, as illustrated in FIG. 5, a light-incident surface of the beamsplitter 118 is concave. The concave reflective surface functions to converge light, so that the beamsplitter 118 may additionally contribute to reduction of an image that is incident on the second image sensor 115. Also, by using the beamsplitter 118 having the concave reflective surface, a width of a reducing optical system may be decreased.

Figure 6A:
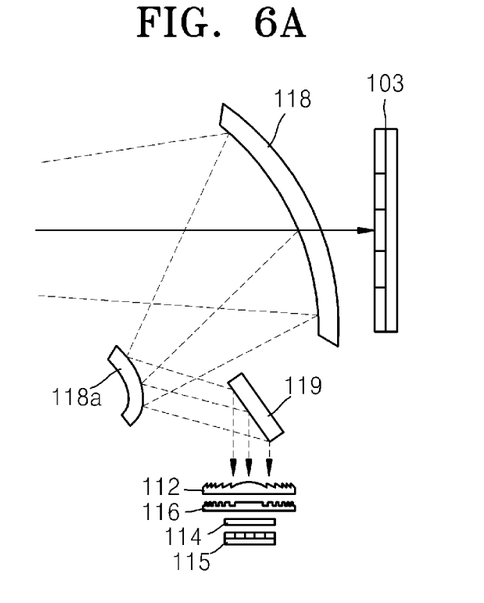
FIG. 6A is a conceptual diagram illustrating a structure of an imaging optical system, according to another exemplary embodiment.
Figure 6B:
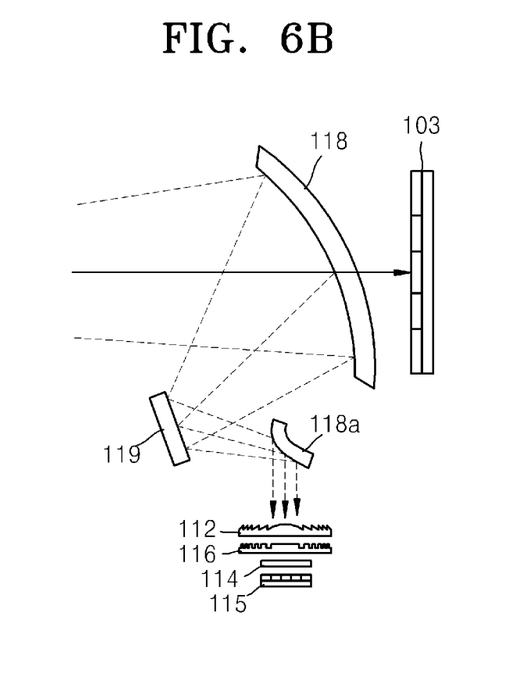
FIG. 6B is a conceptual diagram illustrating a structure of an imaging optical system, according to another exemplary embodiment.

Also, as illustrated in FIGS. 6A and 6B, in order to compensate for distortion of an image which is incurred by the concave reflective surface of the beamsplitter 118, a convex minor 118a having a convex reflective surface may be additionally disposed between the beamsplitter 118 and the optical element 112. For example, as illustrated in FIG. 6A, an image reflected by the beamsplitter 118 may be reflected by the convex mirror 118a and then may be reflected toward the second image sensor 115 by a flat minor 119. Alternatively, as illustrated in FIG. 6B, an image reflected by the beamsplitter 118 may be reflected by the flat minor 119 and then may be reflected toward the second image sensor 115 by the convex minor 118a. Unlike the example of FIG. 5, in the examples shown in FIGS. 6A and 6B, the image reflected by the beamsplitter 118 may not need to directly travel toward the second image sensor 115. Thus, the beamsplitter 118 may be further inclined. Also, since the beamsplitter 118 having the concave reflective surface may reduce an image, the first optical element 112 and the third optical element 116 may be omitted in the examples of FIGS. 6A and 6B.

Also, in order to further decrease the width of the reducing optical system, it is possible to use a plurality of folded beamsplitters, instead of using one flat beamsplitter.

Figure 7A:
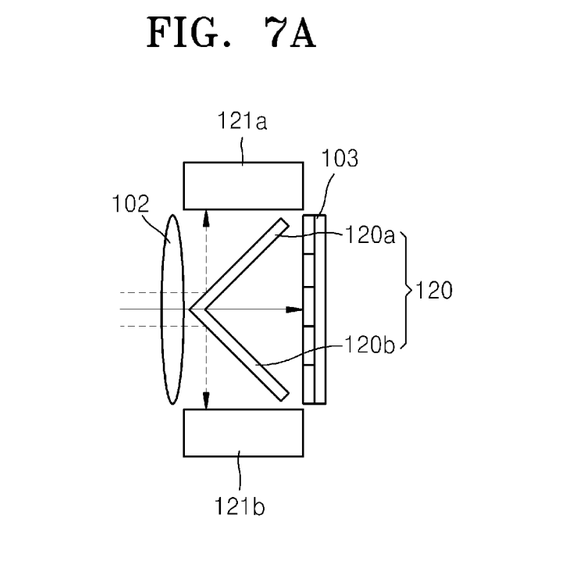
FIGS. 7A and 7B are a side view and a front view illustrating a structure of an imaging optical system, according to another exemplary embodiment.
Figure 7B:
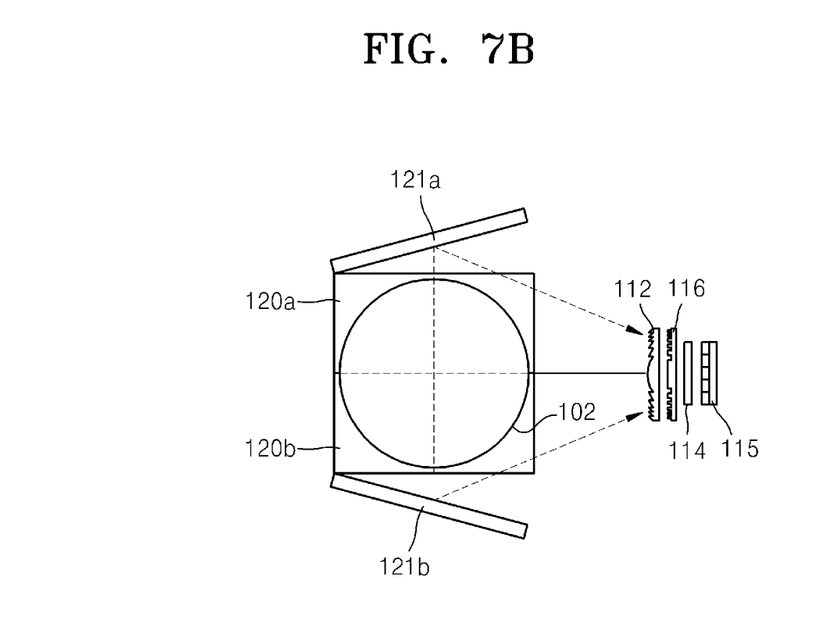

FIGS. 7A and 7B are a side view and a front view of a structure of an imaging optical system, according to another exemplary embodiment.

Referring to FIGS. 7A and 7B, a beamsplitter 120 disposed between an object lens 102 and a first image sensor 103 may include a first dichroic minor 120a and a second dichroic minor 120b that are disposed upward and downward, respectively, with respect to an optical axis of the object lens 102. As illustrated in the side view of FIG. 7A, the first dichroic mirror 120a and the second dichroic mirror 120b partially contact each other on the optical axis, and are folded by a predetermined angle with respect to each other. For example, the first dichroic mirror 120a disposed in an upper region of the optical axis transmits visible light and reflects illumination light that is infrared light toward the upper region of the optical axis. Also, the second dichroic mirror 120b disposed in a lower region of the optical axis transmits the visible light and reflects the illumination light that is infrared light toward the lower region of the optical axis. Thus, an image of the visible light focused by the object lens 102 may pass through the beamsplitter 120 and then may reach the first image sensor 103.

In order to provide an image of the infrared light to a second image sensor 115, when the infrared light is reflected and split into the upper region and the lower region by the first dichroic minor 120a and the second dichroic minor 120b, the imaging optical system may further include a first mirror 121a facing the first dichroic mirror 120a, and a second minor 121b facing the second dichroic mirror 120b. Referring to the front view shown in FIG. 7B, the first mirror 121a may reflect the image, which is reflected toward the upper region by the first dichroic mirror 120a, toward the second image sensor 115, and the second minor 121b may reflect the image, which is reflected toward the lower region by the second dichroic mirror 120b, toward the second image sensor 115. Thus, the infrared image that is divided into two images by the first dichroic minor 120a and the second dichroic minor 120b may be recombined at the second image sensor 115 by the first minor 121a and the second minor 121b. To achieve these results, unlike the previous exemplary embodiments in which the second image sensor 115 is disposed below the beamsplitters 111, 117, and 118, in the exemplary embodiment of FIGS. 7A and 7B, the second image sensor 115 may be disposed at a side region of the beamsplitter 120.

As described above, by using the folded beamsplitter 120, a width of a reducing optical system may be decreased by half, compared to a case of using one flat beamsplitter. Also, instead of using the first dichroic mirror 120a and the second dichroic minor 120b, by using two beamsplitters 117 having the slopes 117a which are shown in FIG. 4A, the width of the reducing optical system may be further decreased. In the exemplary embodiment of FIGS. 7A and 7B, an image may be reduced by the first dichroic mirror 120a and the second dichroic minor 120b, and the first mirror 121a and the second minor 121b, so that the first optical element 112 and the third optical element 116 may be omitted.

Figure 7C:
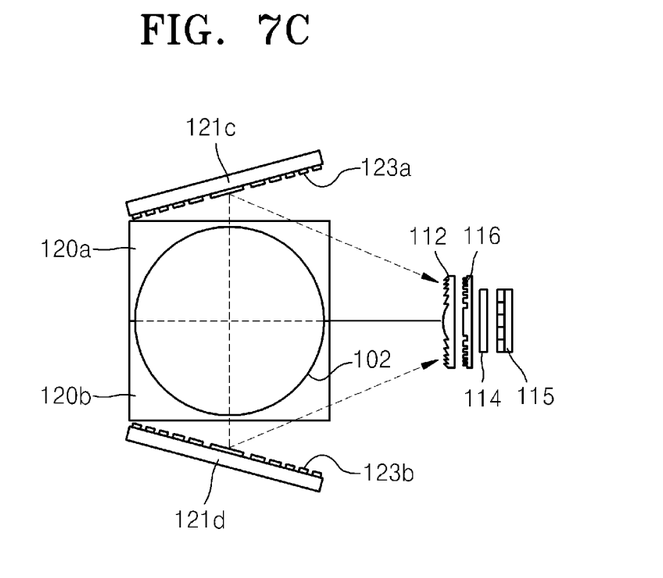
FIG. 7C is a conceptual diagram illustrating a modification of the exemplary embodiment of FIG. 7B.

Also, instead of using the first mirror 121a and the second mirror 121b, as illustrated in FIG. 7C, it is possible to use minors 121c and 121d on which reflective diffraction patterns 123a and 123b having an image reducing function are formed, respectively. The reflective diffraction patterns 123a and 123b that are formed on reflective surfaces of the minors 121c and 121d may additionally contribute to the image reduction performed by the first optical element 112 and the third optical element 116.

Figure 8:
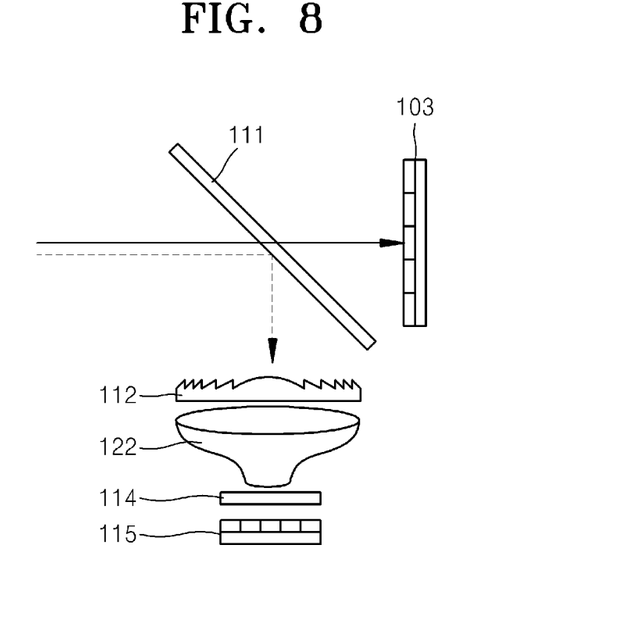
FIG. 8 is a conceptual diagram illustrating a structure of an imaging optical system, according to another exemplary embodiment.
Figure 9:
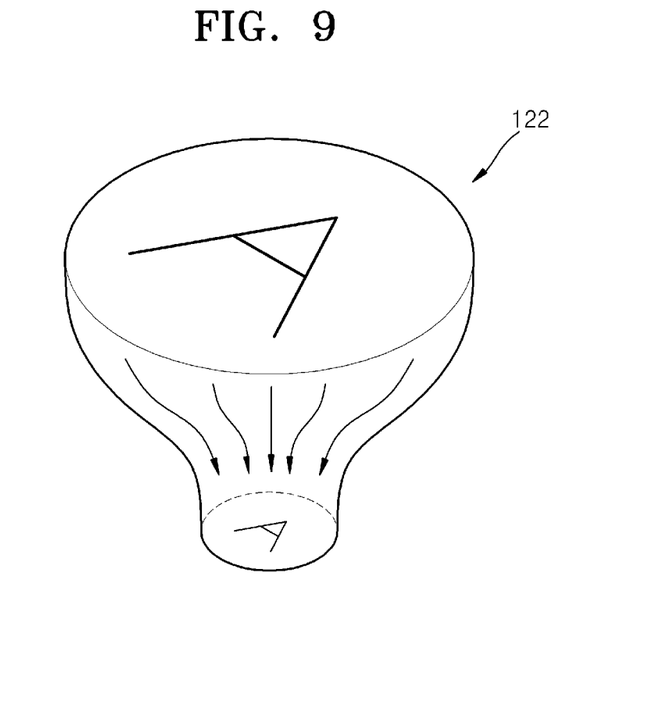
FIG. 9 is a perspective view of a fiber optic taper of FIGS. 8.

FIG. 8 is a conceptual diagram illustrating a structure of an imaging optical system, according to another exemplary embodiment. Referring to FIG. 8, the imaging optical system according to the present exemplary embodiment may include a fiber optic taper 122, instead of the third optical element 116 formed of a DOE. That is, the imaging optical system may have a structure in which a reducing optical system including the first optical element 112 formed of a Fresnel lens and the fiber optic taper 122 is disposed between a beamsplitter 111 and a second image sensor 115. As illustrated in FIG. 9, in general, the fiber optic taper 122 has a structure in which a compression rate of a light-incident portion of a bundle of optical fibers is different from a compression rate of a light-exit portion of the bundle of optical fibers, so as to allow a size of an incident image to be different from a size of an output image. For example, when the light-incident surface of the fiber optic taper 122 is larger than the light-exit surface of the fiber optic taper 122, the fiber optic taper 122 may function to reduce an image.

In the exemplary embodiment of FIG. 8, the fiber optic taper 122 may reduce an image, so that the first optical element 112 and the third optical element 116 may be omitted. Alternatively, only the first optical element 112 formed of a Fresnel lens may be used. In this case, the first optical element 112 formed of a Fresnel lens may function as a collimating element that converts light reflected from the beamsplitter 111 into parallel light. The fiber optic taper 122 may reduce an image by converging the parallel light formed by the first optical element 112 onto the second image sensor 115.

Figure 10:
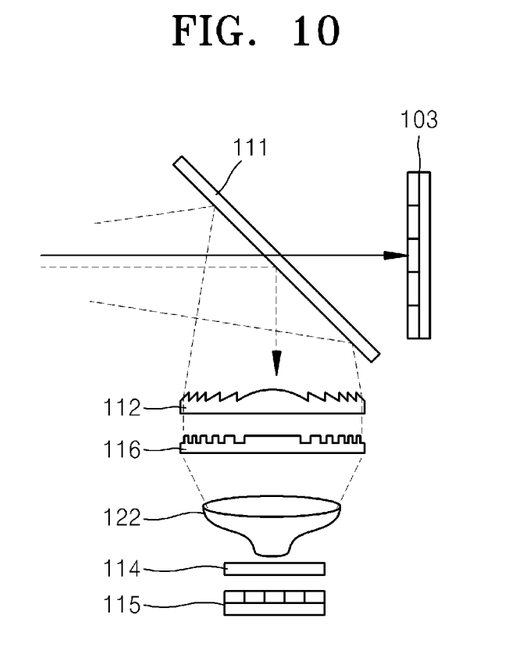
FIG. 10 is a conceptual diagram illustrating a structure of an imaging optical system, according to another exemplary embodiment.

As illustrated in FIG. 10, it is possible to use the fiber optic taper 122 together with the third optical element 116 formed of the DOE. For example, the first optical element 112 formed of a Fresnel lens may convert light reflected from the beamsplitter 111 into parallel light, the third optical element 116 formed of the DOE may reduce an image, and then the fiber optic taper 122 may further reduce the image.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

What is claimed is:

1. An imaging optical system comprising:
   an object lens configured to focus light;
   first and second image sensors, wherein a size of the second image sensor is different from a size of the first image sensor;
   a beamsplitter on which the light focused by the object lens is incident, wherein the beamsplitter is configured to split the light incident thereon into light of a first wavelength band and light of a second wavelength band, direct the light of the first wavelength band to the first image sensor, and direct the light of the second wavelength band to the second image sensor; and
   at least one optical element disposed between the beamsplitter and the second image sensor, wherein the at least one optical element is configured to reduce an image that is incident on the second image sensor,
   wherein the at least one optical element comprises at least one of a Fresnel lens and a diffractive optical element (DOE).

2. The imaging optical system of claim 1, wherein the at least one optical element comprises at least two of the Fresnel lenses that are sequentially disposed along an optical path between the beamsplitter and the second image sensor.

3. The imaging optical system of claim 1, wherein the at least one optical element comprises the Fresnel lens and the DOE that are sequentially disposed along an optical path between the beamsplitter and the second image sensor, and
   wherein the Fresnel lens is a collimating element that converts light reflected from the beamsplitter into parallel light, and the DOE reduces an image by converging the parallel light onto the second image sensor.

4. The imaging optical system of claim 1, further comprising an optical shutter that is disposed between the at least one optical element and the second image sensor and is configured to modulate the light of the first wavelength band and provide the modulated light to the second image sensor.

5. The imaging optical system of claim 1, wherein the size of the second image sensor is smaller than the size of the first image sensor, and the light of the first wavelength band comprises visible light and the light of the second wavelength band comprises infrared light.

6. The imaging optical system of claim 1, wherein the beamsplitter is configured to transmit the light of the first wavelength band and reflect the light of the second wavelength band.

7. The imaging optical system of claim 1,
   wherein the beamsplitter is inclined by more than about 45 degrees with respect to an optical axis of the object lens.

8. The imaging optical system of claim 7, wherein the beamsplitter comprises:
   a plurality of first slopes that are formed on a light-incident surface of the beamsplitter and are each inclined by about 45 degrees with respect to the optical axis of the object lens; and
   a plurality of second slopes that are formed on a light-exit surface of the beamsplitter and have complementary shapes with respect to the plurality of first slopes,
   wherein the plurality of first slopes and the plurality of second slopes are parallel to each other.

9. The imaging optical system of claim 8, wherein the beamsplitter further comprises a wavelength separation filter configured to transmit the light of the first wavelength band and reflect the light of the second wavelength band, and the wavelength separation filter is coated on the plurality of first slopes.

10. The imaging optical system of claim 7, wherein the beamsplitter comprises:
    reflective first diffraction patterns that are formed on a light-incident surface of the beamsplitter, wherein the reflective first diffraction patterns are configured to transmit the light of the first wavelength band and reflect the light of the second wavelength band, and are positioned so that a reflection angle of the reflected light of the second wavelength band is about 45 degrees with respect to the optical axis of the object lens; and
    second diffraction patterns that are formed on a light-exit surface of the beamsplitter and have complementary shapes with respect to the reflective first diffraction patterns.

11. The imaging optical system of claim 1,
    wherein the beamsplitter has a concave reflective surface coated with a wavelength separation filter which is configured to transmit the light of the first wavelength band and reflect the light of the second wavelength band.

12. The imaging optical system of claim 11, further comprising a convex minor configured to reflect the light of the second wavelength band light reflected by the beamsplitter, and a flat minor configured to reflect, toward the second image sensor, the light of the second wavelength band light reflected by the convex minor.

13. The imaging optical system of claim 11, further comprising a flat mirror configured to reflect the light of the second wavelength band reflected by the beamsplitter, and a convex minor configured to reflect, toward the second image sensor, the light of the second wavelength band reflected by the flat minor.

14. The imaging optical system of claim 1,
    wherein the beamsplitter comprises a first dichroic minor and a second dichroic minor which are disposed in an upper region and a lower region, respectively, with respect to an optical axis of the object lens,
    the first dichroic minor and the second dichroic minor partially contact each other along the optical axis, and a reflective surface of the first dichroic mirror forms a predetermined angle with respect to a reflective surface of the second dichroic minor,
    the first dichroic minor is configured to transmit the light of the first wavelength band and reflect the light of the second wavelength band toward the upper region, and
    the second dichroic minor is configured to transmit the light of the first wavelength band and reflect the light of the second wavelength band toward the lower region.

15. The imaging optical system of claim 14, further comprising:
a first mirror that is disposed to face the first dichroic mirror and is configured to reflect, toward the second image sensor, the light of the first wavelength band reflected by the first dichroic minor; and
a second mirror that is disposed to face the second dichroic mirror and is configured to reflect, toward the second image sensor, the light of the first wavelength band reflected by the second dichroic minor.

16. The imaging optical system of claim 15, wherein reflective diffraction patterns having an image reduction function are formed on a reflective surface of the first mirror and a reflective surface of the second minor.

17. The imaging optical system of claim 1, further comprising:
a fiber optic taper disposed between the beamsplitter and the second image sensor, wherein an area of a light-incident surface of the fiber optic taper is greater than an area of a light-exit surface of the fiber optic taper.

18. The imaging optical system of claim 17, wherein the at least one optical element comprises the Fresnel lens which is configured to convert light from the beamsplitter into parallel light, and wherein the fiber optic taper is configured to reduce an image by converging the parallel light onto the second image sensor.

19. The imaging optical system of claim 17, wherein the at least one optical element comprises the Fresnel lens which is configured to convert light from the beamsplitter into parallel light, and the DOE which is configured to reduce an image by converging the parallel light, and wherein the fiber optic taper is configured to additionally reduce the image which is reduced by the DOE.

20. A three-dimensional (3D) image acquisition apparatus comprising:
an imaging optical system comprising:
an object lens configured to transmit light;
first and second image sensors, wherein a size of the second image sensor is different from a size of the first image sensor;
a beamsplitter on which the light transmitted by the object lens is incident, wherein the beamsplitter is configured to split the light incident thereon into light of a first wavelength band and light of a second wavelength band, direct the light of the first wavelength band to the first image sensor, and direct the light of the second wavelength band to the second image sensor; and
at least one optical element disposed between the beamsplitter and the second image sensor, wherein the at least one optical element is configured to reduce an image which is incident on the second image sensor,
wherein the at least one optical element comprises at least one of a Fresnel lens and a diffractive optical element (DOE);
a light source configured to generate light of the second wavelength band light and irradiate the light of the second wavelength band onto a target object;
an image signal processor (ISP) configured to generate a 3D image by using an image output from the first image sensor and an image output from the second image sensor; and
a control unit configured to control operations of the light source and the ISP.

* * * * *